*Dickinson & Bellamy,*
*Setting Gems,*

*N° 15,286.*    *Patented July 8, 1856.*

UNITED STATES PATENT OFFICE.

C. DICKINSON AND W. BELLAMY, OF NEWARK, NEW JERSEY.

SECURING PEARL ORNAMENTS IN HANDLES OF CAST METAL.

Specification of Letters Patent No. 15,286, dated July 8, 1856.

*To all whom it may concern:*

Be it known that we, CHARLES DICKINSON and WILLIAM BELLAMY, of Newark, in the county of Essex and State of New Jersey, have invented a new and improved mode of inserting or securing pearl insulating ornaments in the handles of pots or vessels constructed of britannia-metal and designed to be plated by the galvanic process; and we do hereby declare that the following is a full, clear, and exact description of the same, reference being had to the annexed drawings, making a part of this specification, in which—

Figure 1:
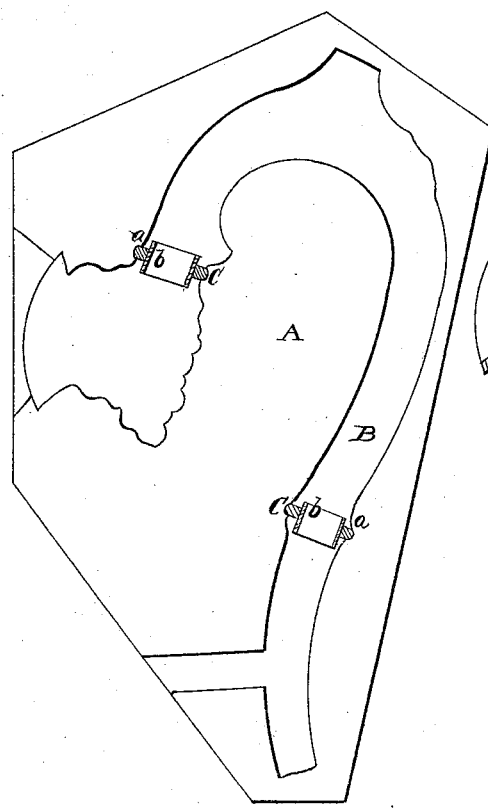
Figure 2:
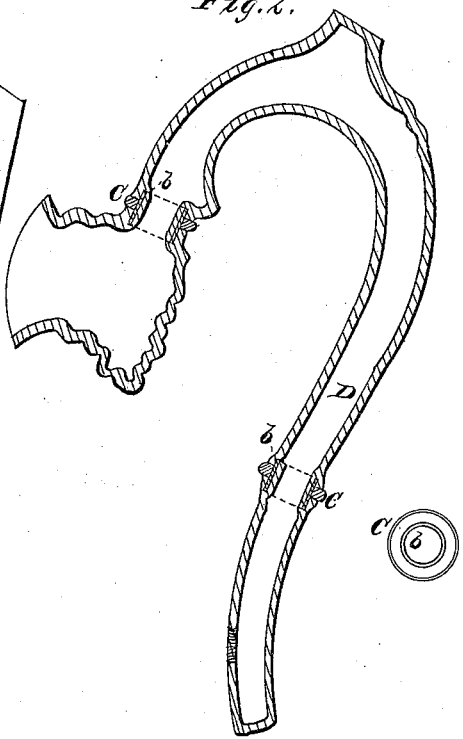

Figure 1, is a view of one half the mold employed for casting the handles. Fig. 2, is a longitudinal section of a handle.

Our invention consists in securing the pearls in the handles by inserting the pearls in grooves in the molds, so that the melted metal will close around thimbles fitted within the pearls, and effectually solder and secure the pearls to the handles.

To enable those skilled in the art to fully understand our invention we will proceed to describe it.

A, Fig. 1, represents one half of a mold, constructed of the usual, or any proper material. In this mold, or rather in this half of it there are made two grooves (*a*), (*a*), and corresponding grooves are made in the other half of the mold, said grooves when the two halves of the mold are put together forming a ring all around the handle, or rather around the cavity B, in which the metal is poured to form the handle.

The pearls C, are circular disks or plates, having holes through their centers, in which thimbles (*b*) are fitted. These thimbles are constructed of tin, or thin sheet iron coated with tin. The thimbles are sufficiently long to project a short distance each side of the pearl disks or plates, as shown in Figs. 1, and 2. The pearl disks with the thimbles within them are inserted in the mold, the disks fitting in the grooves, (*a*), (*a*), which are made of the proper size to receive the edges of the pearl disks. The melted metal is then poured into the mold, which when full is immediately inverted, and as the metal quickly cools on the outer side, in consequence of being in contact with the mold, the inner part will run out, leaving a shell or hollow handle D, and the metal will close around the thimbles, as shown in Fig. 2, firmly securing the pearls in the handle, while the edges of the pearls will project out all around beyond the sides of the handle. This is a very expeditious and effectual mode of securing the pearls in the handles.

The plan now practiced, is to cast the handle in three separate parts, that is where two pearls are inserted in the handle, as shown in Fig. 2. The parts are then soldered together with the pearls between them. This plan consumes considerable time, and as soft solder is used, the parts of the handle adjoining the pearls cannot be well plated by the galvanic process, as the acid employed penetrates the solder, and causes it to assume a black or dirty appearance, making a disagreeable contrast with the more perfectly plated parts. Another objection to the usual plan is, that the handle is not entirely hollow, the three parts at their points of juncture being closed, and the handle cannot be filled with plaster of Paris, or a non-conducting material. If the three parts were filled with plaster they could not be soldered together, as the steam from the plaster would blow out the ends of the parts with the solder. This is a great objection, as the handle when not filled with plaster, often becomes so much heated, that it cannot be grasped by the hand, or held for any length of time as the pearls alone do not sufficiently insulate the handles from the pots or vessels.

We do not claim making the hollow handles by filling the mold with melted metal, and then inverting the mold so that the center portion will run out, for this is an old way of forming the handles, and spouts of metal pots or vessels; but, What we do claim as new and desire to secure by Letters Patent, is, Inserting or securing the pearl disks or plates C, in the handle D, by placing the pearl disks in grooves, (*a*), formed in the mold. The pearl disks having thimbles, (*b*), fitted within them as shown, so that the metal will close around the thimbles, as shown and described.

CHARLES DICKINSON.
WILLIAM BELLAMY.

Witnesses:
O. D. MUNN,
S. H. WALES.